2,868,725

PRODUCTION OF MUD-LADEN DRILLING FLUIDS

William L. Owen, Baton Rouge, La., assignor to John U. Barr, New Orleans, La.

No Drawing. Application June 30, 1952
Serial No. 296,491

27 Claims. (Cl. 252—8.5)

The present invention is directed to providing a well wall of a gas or oil well or equivalent structure with an impervious coating comprising a mud-laden drilling fluid containing a gum dextran-aldehyde complex.

The impervious coating is formed by circulating in contact with the well wall the mud-laden drilling fluid containing as a suspending and water-loss inhibiting agent said gum dextran-aldehyde complex.

In one form of the present invention the mud-laden drilling fluid has present a water-loss inhibiting agent comprising a gum dextran-aldehyde complex in admixture with an inert colloidal absorbent base. In the preferred form of the invention, the gum dextran-aldehyde complex is adsorbed on or absorbed in the colloidal base. The preferred colloidal absorbent base is a composite absorbent medium comprising infusorial earth or equivalent absorbent clay material having integrated therewith an adhesive, preferably a starch compound, including gelatinized starch or the reaction product of starch and an aldehyde, such as acetaldehyde.

Infusorial earth is also known as diatomaceous earth and is a soft earthy rock composed of the siliceous skeletons of small aquatic plants called diatoms. This material is very light, having a specific gravity air dried of 0.24 and when calcined of 0.34, and is also very porous. It is characterized by the property of holding four times its weight of water. Infusorial earth has a low specific gravity so that for a given weight, it has a rather large bulk. It is inert since it is insusceptible to chemical change in the mud-laden drilling fluid. The infusorial earth is also characterized by the property of having high dispersive powers and has negative electrical charges which promote adsorption. Since it readily disperses, it is an admirable absorption base for the preparation of the composite water-loss inhibiting agent which comprises a colloidal absorbent base of infusorial earth and adhered thereto starch and/or the reaction product of starch and an aldehyde as, for example, acetaldehyde, or a mixture of starch and the starch-aldehyde reaction product. The infusorial earth furnishes sufficient nuclei for the adherence thereto of the starch component which may be somewhat degraded and in a sticky state and the starch component furnishes nuclei for the attachment thereto of the gum dextran complex preferably in a precipitated form.

In carrying out the present invention, the starch used may be one previously used in the production of mud-laden drilling fluids, and is a starch or starch-aldehyde product, or a mixture of starch and starch-aldehyde reaction product having considerable swelling power. The starch component which is used in carrying out the present invention is one which is partially gelatinized or hydrolyzed and may be somewhat degraded.

The present invention resides not only in providing the well wall with an impervious coating, but in the method of treating mud-laden drilling fluid containing a mud base to impart thereto optimum wall-building characteristics, this being accomplished by incorporating in the drilling fluid a composite water-loss inhibiting composition comprising the reaction product of gum dextran and a saturated water-soluble aliphatic aldehyde, said reaction product being adhered to an inert colloidal carrier, said carrier having present a gummy or adhesive film or coating.

In the preferred form of the invention, the gum dextran-aldehyde complex is adsorbed in the colloidal absorbent carrier or adsorbed on the surface thereof, or both absorption and adsorption occur.

The present invention is also directed to the water-loss inhibiting composition for addition to the mud-laden drilling fluid and to the production of the water-loss inhibiting composition.

The present invention is an improvement over the mud-laden drilling fluid set forth in U. S. Patent No. 2,360,327, October 17, 1944, of which the present applicant was joint patentee. It is preferred in carrying out the present invention to utilize gum dextran produced by the fermentation of an aqueous solution of a polysaccharide in the presence of a bacterium, and especially by the genus *Leuconostoc mesenteroides* (Cienkowski) Van Tieghem, which will hereinafter be identified by the notation LMCVT, Bergey's Manual Determinative Bacteriology, fifth edition, or by *Leuconostoc dextranicus*.

The yield of gum dextran produced by the above fermentation process can be materially increased by supplying proper nutrients, including autolyzed yeast, as set forth in applicant's prior Patent No. 2,392,258, granted January 1, 1946.

The gum dextran produced by the fermentation of a fermentable sugar including sucrose in the form of either refined or raw cane sugar or refined beet sugar, or molasses, has the formula $(C_6H_{10}O_5)_n$, and is a mucilaginous substance which can be precipitated from aqueous solution by the alcohols and other dehydrating agents. However, the gum dextran which is preciptated is sticky, tenacious, and extremely difficult to handle. Further, aqueous colloidal suspensions of the gum dextran have a very low viscosity, and as to this property cannot be compared with the natural gums such as gum karaya, tragacanth and the locust bean gum.

Gum dextran may be produced by employing the following aqueous substrate:

| | |
|---|---|
| Cane sugar _____gr__ | 150 |
| Tryptone _____gr__ | 10 |
| Yeast extract _____gr__ | 1 |
| Water _____cc__ | 1000 |
| Di-potassium phosphate _____gr__ | 1 |

However, when the gum dextran is treated with a precipitating agent as, for example, ethyl or isopropyl alcohol, in the proportion of two volumes of alcohol to one of the cultured substrate, the precipitated gum when made up of water equivalent to the original volume of the cultured substrate, produced a solution which had practically no viscosity. While ethyl or isopropyl alcohol in specific proportions have been set forth as the precipitating agent, it is to be understood that other precipitating agents and other proportions can be used in the resulting precipitated gum dextran in aqueous solution will have very little viscosity. It is, therefore, quite clear that the nature and constitution of the gum dextran precipitated from a sugar containing substrate which has been fermented by bacteria of the character set forth, has been changed by precipitation and has different properties than are possessed in its originally formed state.

It has been discovered that the water loss of the mud-laden drilling fluid can be greatly inhibited by incorporating therein as a suspension and as a water-loss inhibiting agent a gum dextran-aldehyde complex as, for example, a gum dextran acetaldehyde complex embedded in or around or on a colloidal matrix having absorbent properties, said matrix in the preferred form of the present invention comprising a mixture of starch and infusorial earth. The gum dextran-aldehyde complex is absorbed in and/or adsorbed on the particles of the starch or by the particles of starch or by the particles of infusorial earth or by a mixture of starch and infusorial earth.

In preparing the gum dextran-aldehyde complex, it is preferably desired to dehydrate the gum dextran present in the fermented substrate prior to reacting the gum dextran with the aldehyde.

It has also been discovered that it is highly advantageous to include starch in the fermentation substrate instead of adding the starch after the gum dextran has been formed by the fermentation process. This insures a better integration of the gum dextran with the starch particles, and also accelerates the production of the gum dextran, as it gives a better dispersion thereof while the latter is in its nascent state of formation. Further, the presence of the starch tends to hold the bacteria cells in suspension during the fermentation process and, therefore, prevents the bacteria cells from settling to the bottom of the fermenting vessel. Additionally, the presence of the starch in the substrate which is being fermented as herein set forth serves to maintain a better state of anerobiosis in the substrate, and this is conducive to high yields of gum dextran. The presence of the starch in the gum dextran product, said starch being present during the in situ production of the gum dextrant or separately added after the fermentation of the substrate, facilitates the thorough reaction of the gum dextran with the saturated aliphatic aldehyde. The infusorial earth also performs this function. Since the infusorial earth is highly absorbent, the gum dextran is entrained and to some extent embedded upon the infusorial earth.

The complete amount of starch which is present in the final gum dextran-aldehyde complex composition may be split and a portion of it added during the fermentation process and then after the gum dextran has been formed in the fermentation process, additional amounts of the hydrolyzed or gelatinized starch may be added to the gum dextran fermentation product with or without infusorial earth, but usually with infusorial earth. The resulting product can then be treated to dehydrate the same by heat treatment or by freezing with Dry Ice, as hereinafter more completely described. Thereafter, the resulting mass may be treated with an aldehyde as, for example, acetaldehyde, the latter reacting with the gum dextran to produce a gum dextranaldehyde reaction product. The starch may be aldehyded to some extent or comprise a mixture of aldehyded starch and unaldehyded starch. The amount of starch which is aldehyded may run from 0 to 100%. This starch has adhesive properties and may, if desired, be degraded to a gummy state. The starch adheres to the absorbent carrier base as, for example, infusorial earth. The starch component including starch per se and the aldehyded starch may be partially gelatinized or hydrolyzed. It is desired to point out that the Dry Ice not only functions to freeze the cultured substrate, but also the carbon dioxide tends to remove substantially all the oxygen from the gum dextran and thereby accelerates the formation of aldehyde complexes upon the addition of the aldehyde, for example, acetaldehyde. Since the aldehydes are reducing agents, it is highly desirable to remove the oxygen from the gum dextran.

It may be stated that by freezing or boiling a culture of gum dextran substrate before treatment with the saturated aliphatic aldehyde as, for example, acetaldehyde, the gum dextran produced by fermentation is partially dehydrated and more easily precipitated from the substrate. Further, when the frozen gum dextran is allowed to thaw, or after the boiled gum dextran substrate is allowed to cool, the frozen or boiled material does not quickly re-absorb water.

In carrying out the present invention the aqueous substrate typified by that previously set forth is sterilized at about 240° F. for about 30 minutes, and then seeded with 10 ccs. of the herein described culture of LMCVT. Thereafter, the so-treated substrate is incubated at a temperature favoring the production of a maximum amount of gum dextran. The preferred temperature is between 25° and 30° C. This temperature may be varied considerably and still come within the spirit of the present invention.

The so-prepared medium is allowed to ferment for a suitable length of time until it becomes so viscous that it appears as a solid mass and shows little or no tendency to flow or change its shape when a container of the mass is shaken vigorously. Usually this viscous state is attained at the end of 48 hours, although, here again, the time of fermentation may be considerably varied. The important point is that the time should be sufficient to allow the solution to assume a viscous state of the character set forth. The fermented mash produced as above set forth analyzes as follows:

| | Percent |
|---|---|
| Reducing sugars including levulose | 1.5 |
| Titratable acidity, cc. N/10 NaOH | 3–4 |
| Gum dextran | 7–8 |

The fermented substrate prepared as above set forth is heated so as to accelerate subsequent chemical reaction. Preferably the fermented substrate is heated to 60° C., although, here again, the heating will vary with the character of the materials being treated. Thereafter, the starch and/or infusorial earth or its equivalent is added to provide a carrier for the gum dextran. The infusorial earth or the starch both function to absorb the gum dextran solution and so present innumerable surfaces for interaction. The starch and/or infusorial earth form with the substrate a homogeneous mixture with the gum thoroughly entrained on the surfaces of said added colloidal embedding matrix carrier.

The amount of starch, aldehyded starch or a mixture of the same; and infusorial earth which constitute the composite colloidal carrier base may vary considerably. The composite colloidal carrier material may be added to the gum dextran in such amounts that the final composition including the gum dextranaldehyde complex has present broadly from 5% to 25% of the colloidal carrier base taken on the weight of the composite gum dextran water-loss inhibiting agent, said carrier base including the inert absorbent material as, for example, infusorial earth, and the starch and/or aldehyded starch. More specifically, the water-loss inhibiting gum dextran-aldehyde complex composition may have between 5% and 10% or between 5% and 15% of the colloidal absorbent matrix ingredients, said percentages being taken on the dry weight of the composite gum dextran-aldehyde as, for example, gum dextran-acetaldehyde complex in association with the composite colloidal absorbent carrier. The composite carrier may be defined as a mixture of infusorial earth constituting an inert absorbent base, and an adhesive medium as, for example, starch or aldehyded starch, or a mixture of the same, said starch components being preferably hydrolyzed or gelatinized. The sticky starch component is integrated with infusorial earth forming a component of the composite absorbent carrier.

The composite water-loss inhibiting composition set forth may include starch or aldehyded starch and infusorial earth in equal proportions, the starch component being integrated with the infusorial earth. For example, to the gum dextran there may be added 5% to 25% of the composite absorbent carrier taken on the weight of the dry gum dextran, and of this 5% to 25% of the composite carrier, 50% may be starch and/or aldehyded starch and 50% infusorial earth; or the composite carrier may comprise 40% starch and/or aldehyded starch and 60% infusorial earth; or 20% starch and/or aldehyded starch and 80% infusorial earth; or, alternatively, the starch or aldehyded starch or a mixture thereof may predominate, and the composite carrier for the gum dextranaldehyde complex may comprise 60% starch or aldehyded starch or a mixture thereof and 40% infusorial earth; or 70% starch or aldehyded starch or a mixture thereof, and 30% infusorial earth; or 80% starch or aldehyded starch or a mixture thereof and 20% of infusorial earth. In other words, the composite carrier may comprise a predominating amount, that is, over 50%, of starch and the balance may be infusorial earth, or the composite absorbent carrier may comprise a predominating amount of infusorial earth and the balance may be hydrolyzed or gelatinized starch or aldehyded starch or a mixture thereof.

The water-loss inhibiting composition may comprise 70% to 90% of a gum dextran-aldehyde complex; 5 to 15% of gelatinized starch or aldehyded starch or a mixture of starch and aldehyded starch, and 5% to 15% of an inert colloidal absorbent base as, for example, infusorial earth or its equivalent, said percentages being taken on the weight of the composite dry water-loss inhibiting composition containing the gum dextran-aldehyde complex. It is recognized that these percentages may be departed from somewhat depending on the character of the mud-laden drilling fluid and the geological formations to which the mud-laden drilling fluid comprising the water-loss inhibiting composition is applied. The water-loss inhibiting composition may contain at least 75% of a gum dextran-aldehyde complex, such as a gum dextran acetaldehyde complex, the balance being the colloidal absorbent carrier. Good results are obtained when the water-loss inhibiting composition contains 75% of the gum dextran-aldehyde complex, such as the acetaldehyde complex or its equivalent as herein pointed out, and equal parts by weight of starch and infusorial earth; or the ingredients may comprise 75% gum dextran-aldehyde complex, 5% of starch, and 20% of infusorial earth; or 75% gum dextran-aldehyde complex, 20% starch and 5% infusorial earth, said percentages being taken on the dry weight of the composite water-loss inhibiting composition.

As pointed out, the mixture of gum dextran and added matrix ingredients in proportions to give a final composition of the character referred to herein may be cooled with Dry Ice to a temperature which functions to dehydrate the gum dextran substrate to which the colloidal absorbent carrier has been added. While this step of Dry Ice dehydration is desirable, it is not absolutely necessary and the present invention may be practiced without using the Dry Ice procedure. When using Dry Ice, the mixture of gum dextran and added matrix carrier may be cooled to a suitable temperature which may illustratively be between 10° and 20° F., which is below the freezing point of water. At this point the saturated water-soluble aliphatic aldehyde, as, for example, acetaldehyde or any of the aldehydes herein referred to, is added to the substrate and thoroughly stirred. As the resulting mass is frozen, the mass is thawed just prior to or during the time the water-soluble saturated aliphatic aldehyde is added. After standing for about 15 minutes, the gum dextran-aldehyde complex is distributed on the surface of the colloidal matrix or carrier or is embedded or adsorbed in the colloidal matrix. In order to recover the gum dextran, the resulting mass is precipitated with a precipitating agent which is usually, although not necessarily, an alcohol. While isopropyl alcohol may be used as a precipitating agent, it is understood that other precipitating agents may be used. The gum dextran complex which is a precipitated solid along with the starch and/or the infusorial earth or any carrier that is used, is recovered and dried in any appropriate manner either in a centrifugal high-speed drying machine of the basket type or in an oven. Preferably the drying or ripening temperature is between about 85° F. and 105° F., although, here again, the temperature may vary. The drying is preferably effected in the presence of an oxygen-containing gas as, for example, air, although not limited thereto, said gas not only oxidizing but ageing the gum dextran-aldehyde complex which has been treated as herein set forth including the dehydration step.

The gum dextran-aldehyde complex is preferably treated with an oxygen-containing gas which is air or pure oxygen, and thereby loses its stickiness or tackiness and becomes at least of a doughy consistency which can be handled without sticking to the surface of the drying vessel or the hands of the operator. As an alternative method, the precipitated dextran and aldehyde complex together with the solid components of the character set forth or equivalents, may be partially dried in a centrifugal and the drying operation completed in a drying oven. The composite gum dextran-aldehyde complex suspending agent dries readily within 24 hours and is not hygroscopic. It may be kept indefinitely in a dry state without becoming moist. The supernatant liquor containing a mixture of the water-soluble saturated aliphatic aldehyde, such as acetaldehyde, or the equivalent thereof; water; and the precipitating agent, such as isopropyl alcohol, may be distilled, and the alcohol recovered. Whatever solids may be in solution are likewise recovered.

It may be pointed out that the function of the colloidal carrier or matrix is to disperse the gum dextran solution and thereby provide a large surface for the distribution of the gum dextran as the latter is precipitated by the precipitating agent, and further to accelerate and promote the reaction of the aldehyde as, for example, acetaldehyde, or any water-soluble aliphatic aldehyde with the gum dextran. When the gum dextran complex is precipitated onto the carrier matrix, the gum dextran in its distributed state provides a larger surface area of reaction and thereby accelerates the reaction between the aldehyde and the gum dextran. It may be stated that the colloidal material which is added to the gum dextran or to the reaction product of gum dextran with a saturated water-soluble aldehyde as herein set forth, exercises another essential function and that is the added colloid, such as starch, starch-aldehyde complex or a mixture of these two ingredients, and infusorial earth, or a mixture of starch or aldehyded starch and clay, or a mixture of starch and/or aldehyded starch and insoluble inert absorbent silica-containing compounds, including inert absorbent silicates, increase the bulk or volume of the suspending agent which is added to the mud-laden drilling fluid.

It has been ascertained that one of the criteria of an efficient water-loss inhibition agent which is incorporated in a mud-laden drilling fluid is that the addition agent, such as starch, or infusorial earth, or a mixture thereof, or the equivalents thereof, may have swelling or hydrophilic properties, that is, water-absorbing properties, and that concomitant thereto these colloid addition agents must have what may be termed large bulk suspension. The first-named property of the inert colloidal mass, that is, of being hydrophilic, tends to induce undesirable viscosity levels in the mud-laden drilling fluid. However, the bulk suspension property is essential to high values in inhibiting water loss. A product may have tenacity, and some viscosity, but its bulk has to be adequate to bind the mud ingredients of the mud-laden drilling fluid to prevent settling thereof or, as it is termed, peptinization, and to admit of sufficient particle distribution to affect the relatively large mass of mud ingredients to which it is added.

It has been found that the water-loss inhibiting values of a suspending agent may be approximately evaluated by observing the rate of settling of the mud particles of the mud-laden drilling fluid in a suspension in which the suspension agent is added, and also the bulk occupied by the settled particles. If the settling rate is slow and the final bulk is large, then the mud-laden drilling fluid carrying the suspension agent as, for example, the herein set forth gum dextran-aldehyde complex, or the mixture of the latter and a solid colloidal component such as starch or infusorial earth, will give good results when the mud-laden drilling fluid with the suspending agent is tested under official A. P. I. methods under high pressure.

The above is illustrated by the following example:

A mixture was made of 400 ccs. of the herein recited culture containing gum dextran; 5 grams of starch; 5 grams of infusorial earth. This substrate originally contained 80 grams of sucrose, which is approximately 20%. There would be obtained therefrom roughly about 40 grams of precipitated gum dextran. To this amount of gum dextran there is added 5 grams of starch and 5 grams of infusorial earth which makes 10 grams of inert colloidal absorbent matrix. Based on the weight of the gum dextran, this shows a total addition of matrix carrier in the amount of 25% based on the dry weight of the gum dextran. The percentage of the carrier matrix may vary from 5 to 25% based on the weight of the gum dextran. The resulting mixture of materials was heated in a water bath to about 60° C. as previously set forth in detail, and the material preferably cooled as by freezing, as previously set forth. Thereafter, there was added to the material 250 ccs. of acetaldehyde while allowing the frozen material to thaw. The material was then treated with isopropyl alcohol to precipitate the resulting gum. Thereafter, the mixture of gum and inert colloidal absorbent carrier material was recovered by decanting the supernatant liquor. The liquor was dried in the manner set forth at a temperature of about 25° C.

A saturated salt mixture of clay was made according to A. P. I. specifications, using 500 ccs. of water and the addition of clay, salt, and the water-loss inhibiting composition in the amount of 3% taken on the combined weight of the water, clay, and sodium chloride. This formula is a standard A. P. I. formula:

Water _____ccs__ 500
Clay, 6% _____grams__ 30
Salt, 30% _____do____ 150
Gum dextran-aldehyde complex with colloidal absorbent carrier comprising a mixture of starch and infusorial earth, 3% _____grams__ 20.4

The above mixture contains 3% of the gum dextran-aldehyde complex containing starch component and infusorial earth, said percentage being taken on the combined weight of the water, clay, and sodium chloride constituting the standard test mixture comprising a saturated salt mixture of clay. The tests could have been made using the same gum dextran-aldehyde complex with its colloidal carrier in the amount of 15 grams, which is 3% taken on the weight of the water or 2.24% taken on the weight of the saturated salt aqueous mixture of clay.

In carrying out the tests the clay mixture was aged overnight and then mechanically stirred for about two hours. The water-loss inhibiting composition comprising a mixture of gum dextran-aldehyde complex, starch component, and infusorial earth was then added to the clay mixture and the mixture stirred for two hours and tested in a pressure tester at 100 pounds pressure per square inch. In following this procedure, there may be added to the gum dextran substrate from 6 to 12.5% starch taken on the dry weight of the composite finally produced water inhibiting composition and 6 to 12.5% of infusorial earth taken on the weight of the finally produced composite water-loss inhibiting composition. The aldehyde used in carrying out this example was acetaldehyde and this was added in the amount of 50 to 75 grams of the acetaldehyde for each 10 grams of dry gum dextran in the substrate; that is, 50 to 75 grams of acetaldehyde per 100 ccs. of the substrate, the latter producing 10 grams of dry gum dextran.

The weight of water loss from the resulting mud-laden drilling fluid containing the composite water-loss inhibiting agent prepared and compounded as herein set forth was 1.6 ccs. in 30 minutes. Tests made under substantially identical conditions showed water losses running from 2 ccs. to 2.4 ccs. in a period of 30 minutes.

The following Table I shows the water loss in ccs. in a time period of 30 minutes of a saturated salt drilling mud to separate portions of which were added the following: (1) crude unmodified gum dextran derived from the evaporated fermented substrate; (2) gum dextran-aldehyde complex herein termed modified dextran which was precipitated from solution by the precipitating agents herein set forth without any carrier or supporting membrane; (3) gum dextran-aldehyde complex prepared from a fermented substrate identical with the fermented substrate used for the preparation of (2) gum dextran but in conjunction with a composite carrier comprising 12.5% of starch or the reaction product of starch and aldehyde and 12.5% of infusorial earth, said product being termed composite modified gum dextran; and (4) one of the best prepared starches usually added as an addition agent to the mud-laden drilling fluid.

TABLE I

| Product | Percent Concentration | ccs. water loss in 30 minutes |
|---|---|---|
| (1) Crude gum dextran | 3 (2% NaCl) | 8.75 |
| (2) Modified gum dextran-aldehyde complex—no supporting membrane | 3 | 10.4 |
| (3) Composite modified gum dextran (gum dextran-aldehyde complex with starch and/or starch-aldehyde complex and infusorial earth) | 3 | 2.4 |
| (4) Gelatinized starch addition product now in common use as addition to mud-laden drilling fluids | 3 | 5.2 |

It has also been found that it is highly advantageous to incorporate in the fermentable substrate containing a polysaccharide, such as sucrose and nutrient medium, a small amount of starch. The incorporation of starch in the gum dextran-aldehyde complex prepared as herein set forth facilitates the drying of the product so that the product can be distributed in a dry state from a central source of distribution. When the starch is incorporated in the fermentable substrate and the gum dextran produced in situ in the presence of the starch, there is the additional advantage obtained that the starch forms the matrix or carrier for the formation of the gum dextran resulting from the action of *Leuconostoc mesenteroides* (Cienkowski) Van Tieghem, or of *Leuconostoc dextranicus* upon the sucrose of the substrate.

The following Example I shows the preparation of the gum dextran-aldehyde in the presence of a starch matrix:

*Example 1*

Water _____centimeters__ 200
Sucrose, 20% _____grams__ 42.6
Yeast extract, 0.5% _____do____ 1.0
Calcium carbonate, 2% _____do____ 4.0
Corn steep water, 0.5% _____do____ 1.5
Starch, 2.5% _____do____ 5.0

The above substrate after sterilization was inoculated with a culture of LMCVT for 48 hours. To the substrate there was added 2.5 grams of infusorial earth. In this example the colloidal absorbent carrier is added partially to the substrate prior to fermentation and is present during fermentation of the substrate, and partially to the fermented gum dextran prior to treatment with acetaldehyde.

The substrate would produce on precipitation about 20 grams of dry dextran complex. Therefore, the amount of carrier taken on the weight of the dry dextran complex is about 12½%, and this may broadly vary from about 5% to about 30%.

If the starch was not present during fermentation, then the starch would have been added along with the infusorial earth after fermentation and before the treatment of the gum dextran with the acetaldehyde. After treatment with acetaldehyde, the gum dextran reaction product was then precipitated from solution with isopropyl alcohol. The gelatinized starch is insoluble in the aqueous substrate; therefore, when the alcohol is added, the gum dextran-aldehyde complex is precipitated in or on and adhering to the insoluble adhesive-like starch or starch-aldehyde complex or a mixture of starch and starch-aldehyde complex, said starch component being absorbed in and on said infusorial earth, the latter acting as the absorbent carrier. The precipitate of the gum dextran-aldehyde complex and starch component in combination with the absorbent infusorial earth was thereafter dried and tested for its property of inhibiting water loss in a mud-laden drilling fluid. The above treatment of the substrate was carried out in the detailed manner previously hereinbefore set forth.

A mud mixture was prepared as hereinbefore described and tested after 24 hours' ageing with 3% of gum dextran aldehyde complex formed in the presence of the starch and precipitated on starch and infusorial earth as a membrane carrier, said percentages being taken on the weight of the mud-laden drilling fluid, the latter having a density in the range of 9 to 18 pounds per gallon. When tested the mud-laden drilling fluid with the gum dextran-starch mixture showed a water loss of 1.6 ccs. in 30 minutes.

The following is an additional example showing the preparation of gum dextran addition agent which when added to the mud-laden drilling fluid substantially decreases the water loss of the circulating mud-laden drilling fluid in a predetermined period of time as, for example, 30 minutes:

Example II

One liter of substrate was prepared in accordance with the following:

| | | |
|---|---|---|
| Water | centimeters | 1000 |
| Sucrose | grams | 216 |
| Yeast extract | do | 5 |
| Corn steep water | do | 7.5 |
| Starch | do | 25 |

The above substrate was sterilized and inoculated with a culture of LMCVT and incubated for 48 hours. Thereafter, 200 ccs. were taken and treated with acetaldehyde and the gum dextran-aldehyde complex was then precipitated with isopropyl alcohol. The gum dextran-aldehyde precipitate in admixture with starch component was thereafter dried and tested in a saturated salt water clay drilling fluid having a density of 10 pounds per gallon, 3% of the addition product being added to the drilling fluid. The water loss of the so-prepared circulating drilling fluid was 2.6 ccs. in a period of 30 minutes.

*Example III*

One liter of substrate prepared as set forth in Example II, said substrate containing starch, was sterlized and inoculated with a culture of LMCVT and incubated for 48 hours. The fermented substrate containing the starch was then treated with acetaldehyde and precipitated with isopropyl alcohol, all as previously set forth in detail. Thereafter, 25 grams of infusorial earth was thoroughly mixed in with the fermented substrate. The resulting composite product comprised gum dextran aldehyde complex, and starch in admixture with infusorial earth. This mixture was dried as hereinbefore set forth and tested for its ability to inhibit water loss in a mud-laden drilling fluid. More specifically, a saturated salt mud mixture was prepared. The latter was stirred for two hours and aged overnight and 3% by weight of the so-produced gum dextran-aldehyde complex, starch, and infusorial earth was added, and the mixture stirred for two hours and aged overnight. The resulting mud-laden drilling fluid was then tested at 100 pounds pressure which showed a water loss of 2.8 ccs. for 30 minutes. This method may be modified to incorporate only a portion of the starch in the substrate and then add additional starch to the gum dextran produced as a result of the fermentation process, said additional starch being preferably added before treatment of the admixture of gum dextran and starch with the aldehyde.

It is highly advantageous to add the starch to the substrate before inoculation, as it insures a better integration of the gum dextran with the starch particles and also accelerates the in situ production of the gum dextran from the substrate as the gum dextran is dispersed on the starch particles while it is in the nascent state of formation. This tends to hold the bacterial cells in suspension to prevent their settling to the bottom of the fermenting vessel. It also serves to maintain a better state of anerobiosis in the substrate which is conducive to high yields of gum dextran.

The modified gum dextran-aldehyde complex or the composite modified aldehyde complex, that is, one containing starch and/or aldehyded starch or a mixture of starch and aldehyded starch and infusorial earth or its equivalent, is resistant to microbial action. It seems that when the gum dextran is distributed or embedded on a carrier or membrane of infusorial earth, said gum dextran being preferably adhered to said absorbent carrier by an adhesive such as degraded starch product of the character herein set forth, that the aldehyde which is subsequently added as, for example, acetaldehyde, more intensely penetrates into the mass of the gum dextran and converts the gum dextran into a gum dextran-aldehyde complex, and the starch may be weakly aldehyded. Further, the resulting product is highly resistant to microbial action. The starch which is initially added to the gum dextran may be corn starch or starch derived from any other source.

While modified starches deteriorate rapidly and lose their inhibitory water loss properties within a few days, and crude gum dextran is equally vulnerable to microbial action, the gum dextran-aldehyde complex produced as herein set forth is highly stable even on extreme exposures to deterioration resulting from bacterial decomposition. This is a significant advance in the art and represents an enormous saving to the oil well operator since when unstable inhibitors are used, it is necessary to employ preservatives in the form of formaldehyde or high salt concentrations, and these, of course, increase the expense of operation.

The resistance of the aldehyde-treated modified gum dextran is apparent from the following example:

*Example IV*

A fresh water mud was prepared as herein described in accordance with the following formula:

| | | |
|---|---|---|
| Water | ccs | 500 |
| Clay | percent | 6 |

In aliquot portions of 100 ccs. there was first added (*a*) 3 grams of the ordinary well-known modified starch; and (*b*) 3 grams of dried gum dextran-aldehyde complex. To another 100 cc. portions of the fresh water mud were added various concentrations of a preservative pentachlorophenol. The solutions were introduced into 200 cc. bottles stoppered with tightly fitting rubber stoppers and placed in an incubator at 34° C. The results obtained are shown in the following Table 2:

*Table 2*

| No. | Inhibitor Added | Preservative Added | Days Required to Show Fermentative Changes | Degree of Deterioration |
|---|---|---|---|---|
| 1 | Modified starch | 0 | 2 | Vigorously Fermenting. |
| 2 | do | 0.1 cc. of 10% sol. Pentachlorophenol. | 2 | Fermenting. |
| 3 | do | 1.0 cc. of 10% sol. Pentachlorophenol. | 3 | Do. |
| 4 | do | 2.0 cc. of 10% sol. Pentachlorophenol. | 3 | Do. |
| 5 | Gum dextran aldehyde complex. | 0 | 4 | Slight odor. |
| 6 | do | 0.1 cc. of 10% sol. Pentachlorophenol. | 4 | Very slight odor. |
| 7 | do | 0.5 cc. of 10% sol. Pentachlorophenol. | 6 | Very faint odor. |

The gum dextran-aldehyde complex in the above table was produced by the methods herein set forth wherein the gum dextran was distributed and/or absorbed by a carrier or membrane to expose a large surface of contact, and then treated with acetaldehyde.

While the gum dextran is preferably produced by fermentation of a polysaccharide as, for example, cane sugar with species *Leuconostoc mesenteroides* (Cienkowski) Van Tieghem, there are a number of other bacteria which are well known to ferment polysaccharides and especially sugar solutions in the presence of a nutrient medium. These bacteria may be used in producing the gum dextran which is treated in accordance with the present invention. However, the preferable bactor is genus *Leuconostoc mesenteroides* (Cienkowski) Van Tieghem, as herein specified, as this produces the best yield.

Usually the amount of di- or polysaccharide present in the aqueous substrate varies from 10% to 30%. Satisfactory results are obtained when 10% to 15% of the sucrose or the like is present. The amount of sucrose present influences the amount of gum dextran produced by the bacterial fermentation.

While the removal of water from the gum dextran resulting from precipitation of the gum dextran-aldehyde complex is preferably effected by centrifuging, it is to be understood that any of the prior art methods of drying may be used. Centrifugals are merely an efficient apparatus for effecting the drying. Other prior art apparatus or methods may be substituted for the ones herein disclosed.

While the alcohols are, as stated, preferably used as a precipitating agent to recover the gum material from the gum dextran-aldehyde complex, other prior art precipitating agents may be used. Since the precipitation of gum dextran from suspension in an aqueous solution is well known in the art, it is not desired to be limited to an alcohol as the precipitating agent. The alcohols which have the formula $C_nH_{2n+1}OH$ are set forth on page 28 of Hackh's Chemical Dictionary, third edition, The Blakiston Company, Philadelphia. Any of the monatomic aliphatic alcohols which are liquid may be used to precipitate the gum dextran from the fermented or incubated substrate after the same has been treated as herein set forth, said treatment including the addition of an aldehyde of the character set forth or the preliminary dehydrating step followed by treatment with an aldehyde.

It is preferred to use an alcohol having a low boiling point, that is, below the boiling point of butyl alcohol. Butyl alcohol and higher alcohols produce a product which is exceedingly difficult to dry, and tends to be more of a plastic than a gum.

The liquid aliphatic saturated aldehydes which are suitable for carrying out the present invention are set forth in Hackh, supra, on page 29. The best results are obtained by using the saturated aliphatic aldehydes containing between 1 and 4 carbon atoms in the molecule. Those aldehydes containing between 5 and 6 carbon atoms may also be used.

The sucrose-containing mash which has been fermented as herein set forth may be treated with acetaldehyde. The gum dextran-aldehyde complex may thereafter be precipitated by any of the alcohols herein set forth, and the supernatant liquor decanted from the precipitate. The latter may then be washed with any medium which is insoluble, preferably one of the alcohols, and then centrifuged for 20 to 45 minutes at a centrifugal speed of between 2,000 and 5,000 R. P. M. The partially dried gum, and the latter is in a fairly dry form, is then aged in a current of air at a temperature which may vary between 50° and 105° F., but preferably varies between 85° and 105° F.

While in the preferred form of the invention the gum dextran and/or starch has been subjected to treatment with an aldehyde, it is recognized that fair results may be obtained when gum dextran which has not been subjected to an aldehydic treatment is combined with starch and infusorial earth. The amount of composite colloidal material which may include starch and infusorial earth which may be added to the gum dextran is about the same as the amount which is added to the gum dextran-aldehyde complex. The amount of starch and infusorial earth of which the colloidal matrix is composed may be about the same as that used when mixing the composite colloidal absorbent carrier material with the gum dextran-aldehyde product.

The initials A. P. I. used herein is the abbreviation for American Petroleum Institute.

Referring to the herein disclosure, it is to be understood that upon the addition of the aldehyde as, for example, acetaldehyde, the starch may be weakly aldehyded or may be a mixture of starch and aldehyded starch. Therefore, where the term "starch" is used after an aldehyde has been added to the mixture of gum dextran, starch and infusorial earth, the term denotes starch per se or aldehyded starch or a mixture of unaldehyded starch and aldehyded starch. In some instances the term "starch component" has been used to broadly include starch per se and aldehyded starch.

It is desired to point out that when the mixture of gum dextran, starch and infusorial earth is treated with an aldehyde as, for example, acetaldehyde, that the resulting product may be considered a partially aldehyded starch in which the aldehyded gum dextran is enmeshed. The infusorial earth is an inert absorbent base material which acts as an absorbent medium for the aldehyded starch in which the aldehyded dextran is enmeshed. The mixture of starch or aldehyded starch and infusorial earth serves to provide a zone or interface of partially degraded or tacky or adhesive surface of aldehyded starch which receives the gum dextran or the gum dextran-aldehyde complex when the latter is precipitated. The inert infusorial earth serves to disperse this mass and to absorb the dispersed mass.

In one form of the invention, there has been provided a dry composition for inhibiting water loss in a mud-laden drilling fluid comprising a gum dextran-aldehyde complex in admixture with a colloidal absorbent carrier having integrated therewith a film of sticky adhesive material, said adhesive film having fixed thereto a layer of gum dextran or gum dextran-aldehyde complex. The gum dextran-aldehyde complex may be considered enmeshed by the adhesive, said adhesive and enmeshed gum dextran or gum dextran-aldehyde complex being carried by and embedded in said absorbent carrier which, in the preferred form of the invention, is infusorial earth.

It is desired to point out that the dominant thought of the invention is to integrate with a colloidal absorbent carrier a film of a sticky adhesive material, said adhesive film having fixed thereto a layer of gum dextran or gum dextran-aldehyde complex, said adhesive and enmeshed gum dextran or gum dextran-aldehyde complex being carried by and embedded in said absorbent carrier, the present invention in one of its forms residing in a dry composition having the characteristics above set forth.

What is claimed is:

1. A mud-laden drilling fluid for oil or gas wells, said fluid exhibiting small water loss during use and being adapted to form on the well wall a relatively thin, tough, substantially impervious coating comprising the product formed of a mixture of a mud base, an aqueous fluid component, and a stable wall-building mud-suspending agent comprising the reaction product of gum dextran and a water-soluble aliphatic aldehyde, said reaction product being a gum dextran-aldehyde complex which is adhered to and enmeshed in and on an inert colloidal absorbent carrier.

2. The method defined in claim 1 in which the inert carrier has integrated therewith a starch compound.

3. A mud-laden drilling fluid for oil or gas wells, said fluid exhibiting small water loss during use and being adapted to form on the well wall a relatively thin, tough, substantially impervious coating comprising the product formed of a mixture of a mud base, an aqueous fluid component, and a stable wall-building mud-suspending agent comprising the reaction product of gum dextran and a water-soluble aliphatic aldehyde, said reaction product being a gum dextran-aldehyde complex which is adhered to and enmeshed in and on an infusorial earth carrier.

4. The method of treating a mud-laden aqueous drilling fluid containing a mud base and an aqueous fluid component comprising reducing the water loss of said drilling fluid and imparting thereto optimum wall-building characteristics by incorporating in said drilling fluid a composite wall-building and mud-suspending agent comprising the reaction product of gum dextran and a water-soluble aliphatic aldehyde, said reaction product being a gum dextran-aldehyde complex which is adhered to and enmeshed in and on an inert colloidal absorbent carrier.

5. The method of treating a mud-laden aqueous drilling fluid containing a mud base and an aqueous fluid component comprising reducing the water loss of said drilling fluid and imparting thereto optimum wall-building characteristics by incorporating in said drilling fluid a composite wall-building and mud-suspending agent comprising the reaction product of gum dextran and a water-soluble aliphatic aldehyde, said reaction product being a gum dextran-aldehyde complex which is adhered to and enmeshed in and on an infusorial earth carrier.

6. The method defined in claim 4 in which the absorbent carrier has a sticky adhesive integrated therewith, said gum dextran aldehyde complex being enmeshed in the resulting carrier.

7. The method defined in claim 5 in which the absorbent carrier is infusorial earth which has adhered thereto an adhesive starch component.

8. The method of treating a mud-laden aqueous drilling fluid containing a mud base and an aqueous fluid component comprising reducing the water loss of said drilling fluid and imparting thereto optimum wall-building characteristics by incorporating in said drilling fluid a composite wall-building mud-suspending and water-loss inhibiting agent comprising 70% to 90% of the reaction product of gum dextran and a water-soluble aliphatic aldehyde, said reaction product being a gum dextran-aldehyde complex, 15 to 5% of an adhesive selected from the group of materials consisting of gelatinized starch and the reaction product of starch and an aldehyde, and 15 to 5% of an inert colloidal inorganic absorbent carrier having dispersive properties and possessing nuclei for the adherence thereto of said adhesive material, said gum dextran-aldehyde complex being enmeshed by said adhesive material, said adhesive and enmeshed gum dextran-aldehyde complex being carried by and embedded in said absorbent carrier, said percentages being taken on the weight of the composite dry wall-building and mud-suspending agent.

9. The method of treating a mud-laden aqueous drilling fluid containing a mud base and an aqueous fluid component comprising reducing the water loss of said drilling fluid and imparting thereto optimum wall-building characteristics by incorporating in said drilling fluid a composite wall-building mud-suspending and water-loss inhibiting agent comprising at least 75% of the reaction product of gum dextran and a water-soluble aliphatic aldehyde, said reaction product being a gum dextran-aldehyde complex and equal parts by weight of starch component and an inert inorganic colloidal absorbent carrier having dispersive properties and possessing nuclei for the adherence thereto of the starch, said percentages being taken on the weight of the composite dry wall-building and mud-suspending agent.

10. The method of treating a mud-laden aqueous drilling fluid containing a mud base and an aqueous fluid component comprising reducing the water loss of said drilling fluid and imparting thereto optimum wall-building characteristics by incorporating in said drilling fluid a composite wall-building mud-suspending and water-loss inhibiting agent comprising at least 75% of the reaction product of gum dextran and a water-soluble aliphatic aldehyde, said reaction product being a gum dextran-aldehyde complex and equal parts of starch and infusorial earth, said percentages being taken on the weight of the composite dry wall-building and mud-suspending agent.

11. The method of treating a mud-laden aqueous drilling fluid containing a mud base and an aqueous fluid component comprising reducing the water loss of said drilling fluid and imparting thereto optimum wall-building characteristics by incorporating in said drilling fluid 1 to 3% of a composite wall-building mud-suspending and water-loss inhibiting composition comprising the dry reaction product of gum dextran and a water-soluble aliphatic aldehyde, said reaction product being a gum dextran-aldehyde complex adhered to and embedded in and on an inert inorganic collodial inert absorbent carrier base.

12. A dry composition for inhibiting water loss in a mud-laden drilling fluid comprising a gum dextran-aldehyde complex in admixture with a colloidal inert absorbent carrier having integrated therewith a film of sticky adhesive material, said adhesive film having fixed thereto a layer of gum dextran-aldehyde complex, the latter comprising the reaction product of gum dextran and a water-soluble aliphatic aldehyde.

13. A dry composition for inhibiting water loss in a mud-laden drilling fluid comprising about 5 to about 15% of infusorial earth acting as an absorbent carrier, 5 to 15% of a sticky adhesive integrated therewith, said adhesive being selected from the group of materials consisting of gelatinized starch and aldehydic starch, and 90 to 70% of a gum dextran-aldehyde complex, the latter being enmeshed by said adhesive, said adhesive and enmeshed gum dextran-aldehyde complex being carried by and embedded in said absorbent carrier, said gum dextran-aldehyde complex being the reaction product of gum dextran and a water-soluble aliphatic aldehyde.

14. A dry composition for inhibiting water loss in a mud-laden drilling fluid comprising about 5 to about 15% of an inert absorbent carrier, 5 to 15% of a sticky adhesive integrated therewith, and 90 to 70% of a gum dextran-aldehyde complex, the latter being enmeshed by said adhesive, said adhesive and enmeshed gum dextran-aldehyde complex being carried by and embedded in said absorbent carrier, said gum dextran aldehyde complex being the reaction product of gum dextran and a water-soluble aliphatic aldehyde.

15. The composition defined in claim 12 in which the gum dextran-aldehyde complex is a gum dextran-acetaldehyde complex.

16. A dry composition for inhibiting water loss in a mud-laden drilling fluid comprising about 5 to about 15% of infusorial earth acting as an absorbent carrier, 5 to 15% of a sticky adhesive integrated therewith, said adhesive being selected from the group of materials consisting of gelatinized starch and aldehydic starch, and 90 to 70% of a gum dextran-acetaldehyde complex, the latter being enmeshed by said adhesive, said adhesive and enmeshed gum dextran-acetaldehyde complex being carried by and embedded in said absorbent carrier.

17. The method comprising fermenting an aqueous polysaccharide substrate and producing an aqueous gum dextran suspension, distributing said aqueous gum dextran suspension upon an inert colloidal silicate absorbent carrier to greatly increase the reactive surface of the gum dextran, reacting the so-distributed gum dextran with a saturated water-soluble aliphatic aldehyde, and recovering the resulting gum from the so-treated mass.

18. The method comprising fermenting an aqueous polysaccharide substrate and producing an aqueous gum dextran suspension, distributing said aqueous gum dextran suspension upon an infusorial earth absorbent carrier to greatly increase the reactive surface of the gum dextran, reacting the so-distributed gum dextran with a saturated water-soluble aliphatic aldehyde, and recovering the resulting gum from the so-treated mass.

19. The method defined in claim 18 in which the aldehyde is acetaldehyde.

20. A dry composition for inhibiting water loss in a mud-laden drilling fluid comprising about 5 to about 15% of infusorial earth acting as an absorbent carrier, 5 to 15% of a sticky adhesive integrated therewith, said adhesive being selected from the group of materials consisting of gelatinized starch and aldehydic starch, and 90 to 70% of gum dextran, the latter being enmeshed by said adhesive, said adhesive and enmeshed gum dextran being carried by and embedded in said absorbent carrier.

21. The method comprising fermenting an aqueous polysaccharide substrate containing nutrient materials and starch acting as an adhesive medium for the in situ produced gum dextran reacting the gum dextran distributed on said adhesive medium with a water-soluble aliphatic aldehyde, and recovering the resulting gum from the so-treated mass.

22. The method of producing a mud-laden drilling fluid having low water-loss properties comprising fermenting an aqueous polysaccharide substrate in the presence of nutrients and a carrier for the gum dextran in situ produced as a result of the fermenting action, said carrier distributing the gum dextran upon the carrier surface to increase the reactive surface of the gum dextran, adding additional colloidal inert absorption carrier to the resulting mass, reacting the resulting gum dextran distributed upon its carrier with a saturated water-soluble aliphatic aldehyde, recovering therefrom the resulting gum dextran-aldehyde complex distributed upon the absorbent colloidal carrier and adding from 1 to 3% of said mass to a mud-laden drilling fluid, said drilling fluid having a density in the range of about 9 to about 18 pounds per gallon, said percentage being taken on the weight of the aqueous mud-laden drilling fluid.

23. The method of producing a mud-laden drilling fluid having low water-loss properties comprising fermenting an aqueous substrate in the presence of nutrients and infusorial earth acting as a carrier for the gum dextran in situ produced as a result of the fermenting action, said infusorial earth distributing the gum dextran on its surface to increase the reactive surface of the gum dextran, adding additional infusorial earth to the resulting mass, reacting the gum dextran distributed upon the infusorial earth with the saturated water-soluble aliphatic aldehyde, recovering therefrom the resulting gum dextran-aldehyde complex distributed on said infusorial earth, and adding the so-produced product to a mud-laden drilling fluid.

24. The method defined in claim 23 wherein 1% to 3% of the gum dextran aldehyde complex distributed on the infusorial earth is added to a mud-laden drilling fluid.

25. The method defined in claim 23 wherein 1% to 3% of the gum dextran aldehyde complex distributed on the infusorial earth is added to a mud-laden drilling fluid having a density in the range of about 9 to 18 pounds per gallon, said percentage being taken on the weight of the aqueous mud-laden drilling fluid.

26. A mud-laden drilling fluid for oil or gas wells, said fluid exhibiting small water loss during use and being adapted to form on the well wall a relatively thin, tough, substantially impervious coating comprising the product formed of a mixture of a mud base, an aqueous fluid component, and a stable wall-building mud suspending agent comprising the reaction product of gum dextran and a water-soluble aliphatic aldehyde, said reaction product being a gum dextran aldehyde complex which is adhered to and enmeshed in and on an inert colloidal absorbent silicate carrier.

27. A dry composition for inhibiting water loss in a mud-laden drilling fluid comprising about 5 to about 15% of infusorial earth acting as an absorbent carrier, 5 to 15% of a sticky adhesive integrated therewith, said adhesive comprising the reaction product of starch and acetaldehyde, and 90 to 70% of a gum dextran-acetaldehyde complex, the latter being enmeshed by said adhesive, said adhesive and enmeshed gum dextran-acetaldehyde complex being carried by and embedded in said absorbent carrier.

References Cited in the file of this patent

UNITED STATES PATENTS

| | | |
|---|---|---|
| 2,360,327 | Bailey et al. | Oct. 17, 1944 |
| 2,602,082 | Owen | July 1, 1952 |